(12) United States Patent
Kurihara et al.

(10) Patent No.: US 7,403,676 B2
(45) Date of Patent: Jul. 22, 2008

(54) OPTICAL WAVEGUIDE MODULE

(75) Inventors: Mitsuru Kurihara, Tokyo (JP); Kenji Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 56 days.

(21) Appl. No.: 11/628,848

(22) PCT Filed: Jun. 8, 2005

(86) PCT No.: PCT/JP2005/010517

§ 371 (c)(1),
(2), (4) Date: Dec. 8, 2006

(87) PCT Pub. No.: WO2005/121855

PCT Pub. Date: Dec. 22, 2005

(65) Prior Publication Data

US 2008/0037927 A1 Feb. 14, 2008

(30) Foreign Application Priority Data

Jun. 9, 2004 (JP) ............................. 2004-171551

(51) Int. Cl.
*G02B 6/12* (2006.01)
*H04J 14/02* (2006.01)

(52) U.S. Cl. .............................. 385/14; 385/49; 385/88; 385/92; 385/129; 385/130; 398/85

(58) Field of Classification Search ................... 385/14, 385/92, 93, 94, 49, 88, 89, 129, 130, 131, 385/132, 140; 398/85
See application file for complete search history.

(56) References Cited

U.S. PATENT DOCUMENTS

| | | | |
|---|---|---|---|
| 5,625,734 A | 4/1997 | Thomas et al. ................. 385/88 |
| 6,850,674 B2* | 2/2005 | Haraguchi et al. ............. 385/49 |
| 2004/0101306 A1* | 5/2004 | Morita et al. .................. 398/85 |
| 2004/0114932 A1* | 6/2004 | Tanaka et al. .................. 398/85 |
| 2007/0009199 A1* | 1/2007 | Yokino et al. .................. 385/14 |
| 2008/0037927 A1* | 2/2008 | Kurihara et al. ................ 385/14 |

FOREIGN PATENT DOCUMENTS

| | | | |
|---|---|---|---|
| JP | 05-145091 | 6/1993 | ................... 385/88 |
| JP | 06-208030 | 7/1994 | ................... 385/88 |
| JP | 10-054917 | 2/1998 | ................... 385/88 |
| JP | 11-202140 | 7/1999 | ................... 385/88 |
| JP | 11-352341 | 12/1999 | ................... 385/88 |
| JP | 2001-133666 | 5/2001 | ................... 385/88 |
| JP | 2001-305365 | 10/2001 | ................... 385/88 |
| JP | 2002-353508 | 12/2002 | ................... 385/88 |

* cited by examiner

*Primary Examiner*—Brian M Healy
(74) *Attorney, Agent, or Firm*—Young & Thompson

(57) ABSTRACT

An optical waveguide module includes a wiring board, and a light-receiving element and optical waveguide substrate that are positioned on both sides of this wiring board. The wiring board includes a base member having transparency to light of the wavelength that can be received by the light-receiving element; surface electrical wiring on the surface of the base member, and filter film on the rear surface of the base member for passing only light of the wavelength that can be received by the light-receiving element and for reflecting light of other wavelengths. An aperture larger than the core of the optical waveguide is formed in the surface electrical wiring. The light-receiving element (9) is flip-chip mounted on surface electrical wiring (4) using bumps (11), and the light-receiving region (10) of the light-receiving element (9) is arranged to face the wiring board (7).

9 Claims, 4 Drawing Sheets

OPTICAL WAVEGUIDE MODULE

TECHNICAL FIELD

The present invention relates to an optical waveguide module used in optical communication, and more particularly in wavelength-division multiplex transmission.

BACKGROUND ART

The expansion of the areas of application of optical communication systems in recent years has brought with it a demand for smaller and cheaper optical modules. In particular, in subscriber optical communication systems, i.e., systems that use optical fiber for connecting users' homes and the stations of communication providers (also called "optical access systems" and "FTTH (Fiber To The Home")), wavelength-division multiplex communication is desired for realizing two-way optical communication through the use of two wavelengths in one optical fiber. As a result, the realization of a smaller and cheaper wavelength-division multiplex optical transmitter and receiver module required for such a communication system has become a crucial issue. Given these circumstances, optical waveguide modules are being investigated and put into practical use as constructions that enable smaller size and lower cost.

Explanation next regards prior-art examples of optical waveguide modules.

FIG. 1 shows the configuration of the first prior-art example of an optical waveguide module (disclosed in JP-A-2001-133666 and JP-A-2001-305365). Wavelength filter plate 102 that includes filter film 103 and light-shielding film 104 is secured by resin 106 to the end surface, which is close to the light-receiving element 107, of optical waveguide substrate 100 on which optical waveguide 101 is formed. Filter film 103 passes light of the wavelength which can be received by light-receiving element 107 and reflects light of other wavelengths. Light-shielding film 104 of wavelength filter plate 102 includes aperture 105 for passing the light which can be received by light-receiving element 107. Wavelength filter plate 102 is positioned with respect to optical waveguide substrate 100 such that aperture 105 is aligned with the optical axis of optical waveguide 101. This optical waveguide substrate 100 is secured to ceramic substrate 111 by solder 112. Light-receiving element 107 is bonded to light-receiving element carrier 109 by solder 110. Light-receiving element carrier 109 is bonded to ceramic substrate 111 by solder 113. In this optical waveguide module, the relative positional accuracy of the optical axis of light-receiving element 107 and the optical axis of optical waveguide 101 depends on the positional accuracy of light-receiving region 108 of light-receiving element 107 with respect to the contour of light-receiving element carrier 109 and the relative positional accuracy of light-receiving element carrier 109 and optical waveguide substrate 100 that are bonded to ceramic substrate 111.

A light-emitting device (not shown) is mounted on optical waveguide substrate 100. The light-emitting device emits light of wavelengths different from the wavelength which can be received by light-receiving element 107 and this light is propagated through optical waveguide 101. Nearly all of the light that is emitted from the light-emitting device and propagated through optical waveguide 101 is reflected by filter film 103 of wavelength filter plate 102, whereby unnecessary light that is incident on light-receiving element 107 can be reduced to a small amount. Light-shielding film 104 further cuts off the small amount of unnecessary light that is produced when leaked light emitted from the light-emitting device but not incident on optical waveguide 101 is propagated through optical waveguide substrate 100 and then passed through filter film 103, whereby the propagation of the unnecessary light to light-receiving element 107 can be prevented.

FIG. 2 shows the structure of the second example of the prior art of an optical waveguide module (disclosed in JP-A-H10-54917). Wavelength filter plate 123 is inserted midway in optical waveguide 121 that is formed on optical waveguide substrate 120. Wavelength filter plate 123 passes light of wavelength λ1 which can be received by light-receiving element 125 and emitted by light-emitting device 126, and reflects light of other wavelengths. Of the light of the plurality of wavelengths that is propagated through common port 122, only light of wavelength λ1 is passed through wavelength filter plate 123, and light of other wavelengths is reflected by wavelength filter plate 123 and directed to reflection port 124. Optical waveguide 121 is split into two after wavelength filter plate 123 to realize optical coupling with each of light-receiving element 125 and light-emitting device 126. Light-receiving element 125 and light-emitting device 126 are mounted on optical waveguide substrate 120 such that their optical axes are aligned with each of optical axes of two split optical waveguides 121. Leaked light that is emitted from light-emitting device 126 but that is not incident on optical waveguide 121 is propagated through optical waveguide 121 but cut off in the portions of light-shielding grooves 127, whereby the propagation of the leaked light from light-emitting device 126 to reflection port 124 can be prevented.

However, the above-described optical waveguide modules of the prior art have the following problems.

As previously described, in the first example of the prior art, the relative positional accuracy of the optical axis of light-receiving element 107 and the optical axis of optical waveguide 101 depends on the positional accuracy of light-receiving region 108 of light-receiving element 107 with respect to the outer shape of light-receiving element carrier 109 and the positional accuracy of light-receiving element carrier 109 and optical waveguide substrate 100 secured to ceramic substrate 111. Wavelength filter plate 102 must be secured accurately such that the position of aperture 105 is aligned with the light which is emitted from optical waveguide 101 through filter film 103 so that the light is not blocked. An optical waveguide module that is used in wavelength-division multiplex transmission requires accurate assembly such that divergence of the optical axis is kept small (error on the order of ±5 μm to ±10 μm). The configuration shown in FIG. 1, for example, requires three high-accuracy assembly steps (a step for attaching light-receiving element 107 to light-receiving element carrier 109, a step for securing optical waveguide substrate 100 and light-receiving element carrier 109 to ceramic substrate 111, and a step for attaching wavelength filter plate 102 to optical waveguide substrate 100), and therefore necessitates expensive high-accuracy assembly devices for this assembly. Two wiring formation steps (a step for forming electrical wiring between light-receiving element 107 and light-receiving element carrier 109, and a step for forming electrical wiring between light-receiving element carrier 109 and ceramic substrate 111) are further required. The fabrication of the configuration of the first prior-art example therefore requires many high-accuracy assembly steps, and these requirements not only increase fabrication costs but also impede improvements in yield. In addition, the need to realize high-accuracy assembly requires the use of a ceramic having excellent mechanical strength and a low level of heat distortion as the material of light-receiving element carrier 109 and ceramic substrate 111, and further requires high dimensional accuracy in which error is suppressed to approximately ±1 µm, further contributing to high fabrication costs.

The second example of the prior art requires the use of edge-incidence type light-receiving element 125 on which light is incident from the end surface. Edge-incidence type light-receiving element 125 involves higher costs than a conventional main surface-incidence type light-receiving element on which light is incident from main surface, and there are currently extremely few types of products that can be used. Furthermore, light-receiving element 125 must be mounted such that the error between the optical axis of optical waveguide 121 and the optical axis of light-receiving element 125 is on the order of ±1 µm, and this process requires an extremely expensive high-accuracy mounting device. In addition, for some types of optical waveguide module, the location at which light-emitting device 126 is mounted and the location at which light-receiving element 125 is mounted must each be separately provided on expensive optical waveguide substrate 120. In this case, the quantity of optical waveguide substrates 120 that can be fabricated from a single substrate is reduced, again resulting in higher costs.

In either of the first prior-art example and second prior-art example, determination of whether optical coupling between optical waveguides 100 and 121 and light-receiving elements 107 and 125 is adequate (whether the desired performance will be achieved) cannot be carried out until the assembly steps and wiring forming steps are completed. As a result, the problem arises that a typical active alignment method cannot be adopted in the step of aligning the optical axes when assembling the optical module. In other words, a method cannot be employed in which current is allowed to flow to the light-receiving element while light is emitted from the optical waveguide to the light-receiving element, the optical coupling efficiency between the light-receiving element and optical waveguide are monitored while the relative positions are adjusted such that the two components achieve the best positional relation, following which the two components are secured.

DISCLOSURE OF THE INVENTION

It is an object of the present invention to solve the above-described problems and to provide an optical waveguide module that has a simple configuration, that is easy to mount and assemble, and that features both small size and low fabrication costs. 0

According to the present invention, an optical waveguide module comprising: a wiring board in which electrical wiring is formed on at least one surface; a light-receiving element that is mounted on the wiring board such that the light-receiving region is arranged to face the surface on which the electrical wiring has been formed; and an optical waveguide substrate on which an optical waveguide has been formed that is positioned on the opposite side from said light-receiving element with the wiring board interposed; is characterized in that: a base member of the wiring board has transparency with respect to light of the wavelength that can be received by the light-receiving element; a wavelength filter for reflecting light of wavelengths other than the wavelength that can be received by the light-receiving element, is arranged between the base member of the wiring board and the optical waveguide; an aperture is formed in the electrical wiring at a position that faces the light-receiving region of the light-receiving element, this aperture being larger than the contour of the core of the optical waveguide; and the end of the optical waveguide of the optical waveguide substrate and the light-receiving region of the light-receiving element are optically coupled through said wavelength filter and said aperture.

According to this optical waveguide module, the light-receiving element is mounted on the wiring board, and the wiring board is directly attached to the end of the optical waveguide substrate. Accordingly, as long as the relative position relationships of the three components, i.e., the light-receiving element, the wiring board, and the optical waveguide substrate, are accurate, high accuracy is not demanded in steps for attaching other members. As a result, the number of steps that requires strict accuracy is decreased when compared to the configuration of the prior art in which the light-receiving element and the optical waveguide substrate are each independently attached to the substrate.

The wavelength filter may be a film formed on the surface on the side of the wiring board that is opposite side from the surface on which the light-receiving element is mounted. In this case, the number of members is decreased and the configuration is simplified, whereby the attaching operation is facilitated.

In addition, the wavelength filter may also be a plate arranged between the optical waveguide substrate and the surface of the wiring board that is opposite side from the surface on which the light-receiving element is mounted. This configuration eliminates the need to prepare a special wiring board on which a film-shaped wavelength filter is formed and allows the free selection and use of a plate-shaped wavelength filter that is conventionally fabricated and in use, and this configuration is therefore efficient and practical, and decreases fabrication costs. The aperture in the electrical wiring may be formed at a position that faces the light-receiving region and may extend over a wider area than the area of contour of the light-receiving region; and the plate-shaped wavelength filter may have a configuration comprising a light-shielding film for shielding light that is not required for light-receiving in the light-receiving element, and having an aperture formed at the position of the light-shielding film that faces the light-receiving region of the light-receiving element, this aperture being larger than the contour of the core of the optical waveguide. This configuration allows a further relaxation of the relative positional accuracy in the step of attaching the light-receiving element and wiring board and therefore further facilitates fabrication and reduces fabrication costs.

The aperture in the electrical wiring and the aperture formed in the base member may be communicated with each other to form a hole through the wiring board. In this case, the fabrication of the through-hole is easier than formation of an aperture only in the electrical wiring.

The wiring board may be formed using a flexible dielectric member as the base member. In this case, the wiring board preferably bends in a location other than the portion in which the light-receiving element is mounted, and the surface of one part of the wiring board is preferably substantially parallel to the optical axis of the optical waveguide. In typical optical modules, a configuration is common in which the optical axis of the optical waveguide and the wiring board at the end of the optical module are parallel, and this type of configuration is usually preferable. When a flexible dielectric is used as the base member of the wiring board, a configuration in which the optical axis of the optical waveguide is parallel to the wiring board at the end of the optical module can be realized by bending the wiring board on which the optical element is mounted. In particular, flexible wiring boards that employ polymers as the base member are widely used in many electronic apparatuses. These boards are extremely inexpensive and have the merit of enabling inexpensive modules through the use of this type of wiring board.

An integrated circuit chip may also be mounted closely to the light-receiving element on the wiring board. The electrical output signal of the light-receiving element is extremely weak, and an integrated circuit for amplifying the signal is therefore preferably mounted as close as possible to the light-receiving element. A flexible wiring board that uses a material such as polymer as a base member is also suitable for mounting such an integrated circuit.

By means of the present invention, the number of steps that require strict high-accuracy assembly can be decreased compared to the prior art, and steps for wiring to the light-receiving element can further be eliminated. The present invention can therefore facilitate fabrication and lower fabrication costs. In addition, because the wiring board is directly secured to the optical waveguide substrate, members such as an expensive ceramic substrate or light-receiving element carrier are not required, whereby the number of members is decreased and the fabrication costs is reduced. In addition, the optical waveguide module of the present invention enables the use of the conventional and inexpensive main surface-incidence type light-receiving element. Space for mounting a light-receiving element is not required on the expensive optical waveguide substrate, whereby a reduction of costs can be achieved through the reduction in size of the optical waveguide substrate to be used.

In the optical waveguide module of the present invention, the electrical wiring is also completed in the stage of mounting the light-receiving element on the wiring board, and as a result, the characteristics of the light-receiving element can be examined and defective elements can be eliminated before bonding to the optical waveguide substrate. Accordingly, it is possible to mount only good light-receiving elements to the optical waveguide substrate, and the expensive optical waveguide substrate can therefore be used effectively without wasting. Still further, an active alignment method can be used as the method for alignment of the optical axis of the optical waveguide and the optical axis of the light-receiving element, whereby the efficiency of optical coupling can be improved.

Finally, the use of a wiring board having a flexible material such as polymer enables securing of the optical waveguide substrate and wiring board to the same substrate to enable a simple and easy optical module structure. An integrated circuit chip for amplifying the light-receiving signal can be easily mounted close to the light-receiving element to achieve an improvement in performance.

BEST MODE FOR CARRYING OUT THE INVENTION

Explanation next regards details of the embodiments of the present invention with reference to the accompanying figures.

Figure 3:
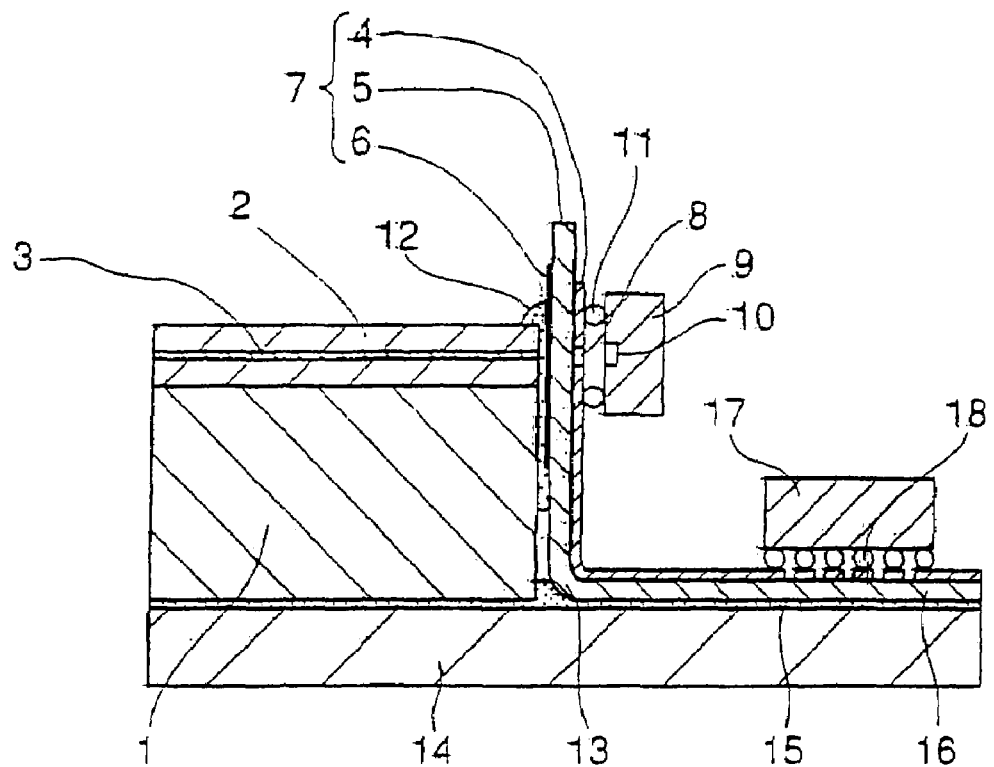
FIG. 3 is a sectional view showing the optical waveguide module of the first embodiment of the present invention.

FIG. 3 is a view showing the configuration of optical coupling between an optical waveguide and a light-receiving element of the optical waveguide module of the first embodiment of the present invention. FIG. 3 is a sectional view taken along a cutting surface including the optical axis of the core of the optical waveguide.

In the present embodiment, wiring board 7 having a thickness of 50 μm is composed of base member 5, surface electrical wiring 4, and filter film (wavelength filter in a film shape) 6. Base member 5 has transparency with respect to light of wavelength $\lambda 1$ (for example, 1.55 μm) that can be received by light-receiving element 9. Filter film 6 is formed on the rear surface of surface electrical wiring 4, and has characteristics for passing light of wavelength $\lambda 1$ that can be received by light-receiving element 9 and for reflecting light of other wavelengths. Aperture 8 having a diameter of 100 μm, which is larger than a diameter of core 3 of the optical waveguide, is formed in surface electrical wiring 4. Main-surface-incidence type light-receiving element 9 is flip-chip mounted on surface electrical wiring 4 using gold stud bumps 11 having a height of approximately 20 μm. Light-receiving region 10 of this light-receiving element 9 is arranged to face wiring board 7. The accuracy of mounting light-receiving element 9 on wiring board 7 should be in a degree such that light-receiving region 10 having a diameter of 80 μm of light-receiving element 9 is within the area of aperture 8 having a diameter of 100 μm, and more specifically, should have error on the order of ±10 μm. The surface of filter film 8 of wiring board 7 is secured to the end surface of optical waveguide substrate 1 by means of resin 12. The optical axis of core 3 of optical waveguide 2 is aligned with the center of light-receiving region 10 of light-receiving element 9 with an accuracy having error on the order of ±5 μm to ±10 μm.

In the present embodiment, moreover, base member 5 of wiring board 7 is composed of a flexible material such as a polymer. Thus, as shown in FIG. 3, the portion of wiring board 7 on which light-receiving element 9 is mounted is secured to the end surface of optical waveguide substrate 1 by means of resin 12, as previously described, bend 13 is bent at a substantially right angle, and substrate region 16 of wiring board 7 is secured together with optical waveguide substrate 1 to substrate 14 by resin 15. Signal amplification IC (an integrated circuit chip) 17 for amplifying the light-receiving signal of light-receiving element 9 is mounted on substrate region 16 by means of bumps 18.

When fabricating this optical waveguide module, wiring board 7 and optical waveguide substrate 1 are placed in alignment to each other and secured together after light-receiving element 9 has been secured to wiring board 7 by means of bumps 11. At this time, current can be allowed to flow to light-receiving element 9 while light is directed from optical waveguide 2 to light-receiving element 9, and, while monitoring the optical coupling efficiency, the relative positions of light-receiving element 9 and optical waveguide 2 can be adjusted such that the optimum positional relation between these two components is achieved, following which resin 12 is used to secure wiring board 7 to optical waveguide substrate 1. In other words, an active alignment method can be implemented. Accordingly, the alignment and securing of light-receiving element 9 and optical waveguide 2 can be carried out both easily and with high accuracy. However, light-receiving element 9 can also be secured to wiring board 7 after wiring board 7 and optical waveguide substrate 1 have been aligned and secured.

Because the optical axis of optical waveguide 2 and substrate region 16 of wiring board 7 are parallel in the present embodiment, connection with other members can be carried out easily, and the mounting of members such as signal amplification IC 17 to substrate region 16 can be carried out easily and with high reliability.

Although not shown in the figure, the mounting position of signal amplification IC 17 may be a position that is parallel to light-receiving element 9 (a position which faces the end surface of optical waveguide substrate 1). In this case, if signal amplification IC 17 is placed close to light-receiving element 9, even weak electrical output signals of the light-receiving element can be effectively transmitted to signal amplification IC 17 and thus amplified.

The mounting of signal amplification IC 17 may be carried out before securing substrate region 16 to substrate 14, or may be carried out after securing substrate region 16 to substrate 14.

Figure 1:
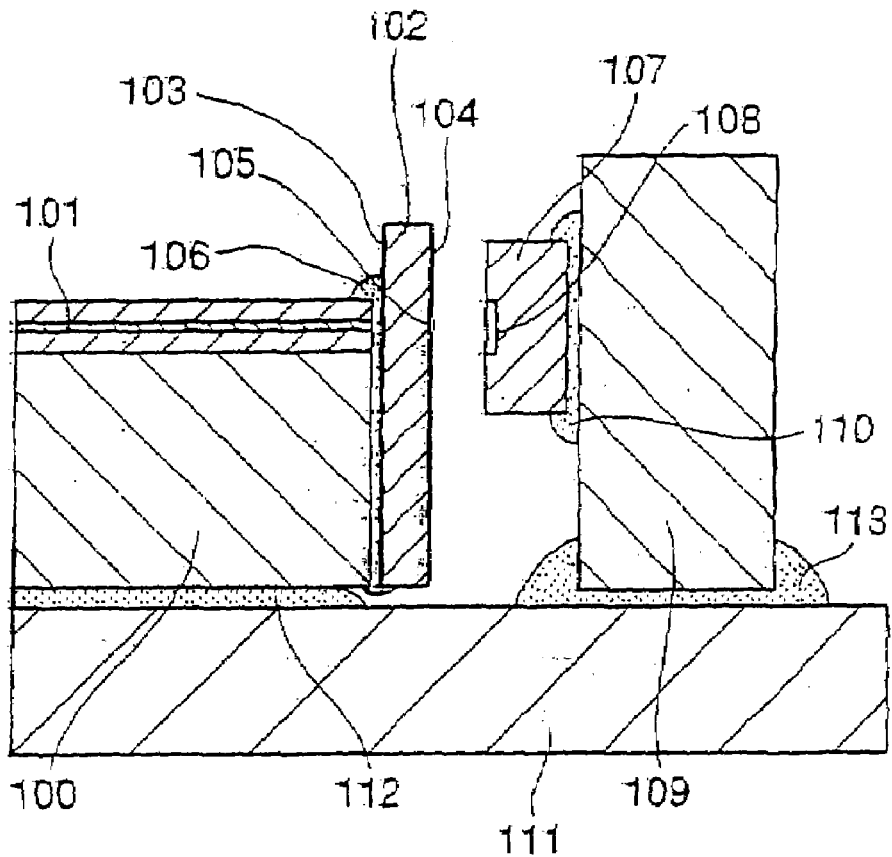
FIG. 1 is a sectional view showing the structure of the first prior-art example of an optical waveguide module.
Figure 2:
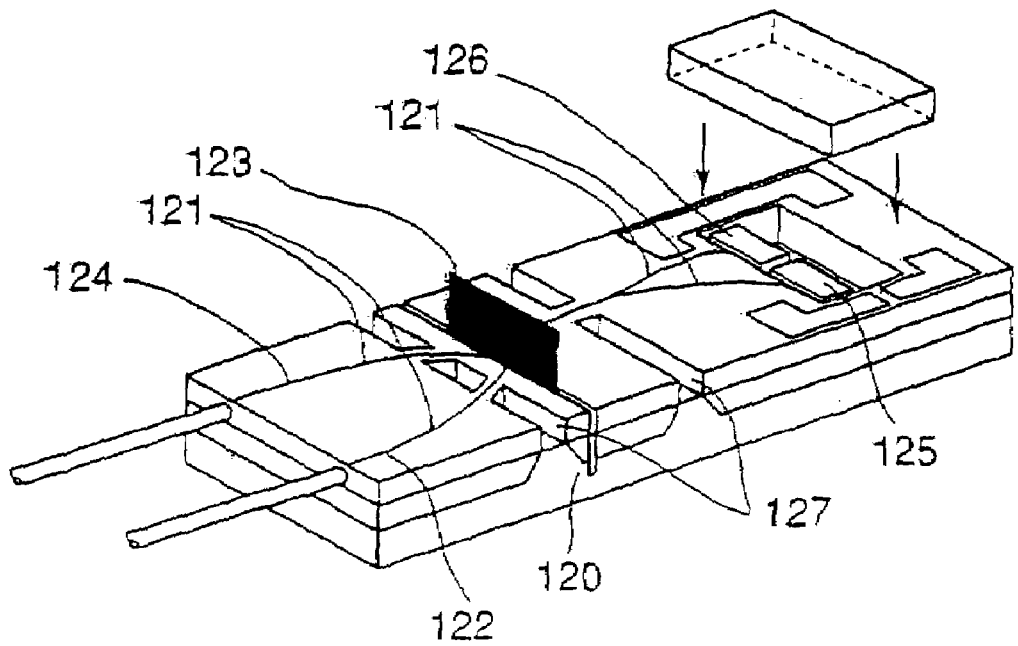
FIG. 2 is a perspective view showing the structure of the second prior-art example of an optical waveguide module.

Compared to the prior art, the present embodiment decreases the number of assembly steps for forming the optically coupled structure of optical waveguide 2 and light-receiving element 9, and in particular, decreases the number of assembly steps that require high accuracy. As a result, the present embodiment greatly facilitates fabrication. More specifically, as long as high accuracy is achieved for the relative positional relation of the three components, i.e., light-receiving element 9, wiring board 7, and optical waveguide substrate 1, the steps for attaching other components do not require particularly high accuracy. In the configuration of the prior art shown in FIG. 1, light-receiving element 107 and optical waveguide substrate 100 are each independently attached to substrate 111, and high accuracy is necessary for each of the relative positional relations of light-receiving element 107, light-receiving element carrier 109, optical waveguide substrate 100, and substrate 111. Compared to this configuration of the prior art, the present embodiment entails fewer steps that require strict accuracy.

In addition, a wavelength filter plate need not be provided separate from the wiring board, whereby fewer components are required than in the prior art. Further, the present embodiment does not require the use of expensive materials (such as ceramics), which were necessary for achieving higher accuracy in the prior art, and the present embodiment can therefore employ cheaper materials than in the prior art. As a result, fabrication costs can be lowered.

The present embodiment allows the use of conventional and cheap main surface-incidence type light-receiving element 9, whereby the space is not required for mounting light-receiving element 9 on expensive optical waveguide substrate 1, and the size of expensive optical waveguide substrate 1 to be used can thus be reduced to achieve a further reduction in costs.

Figure 4:
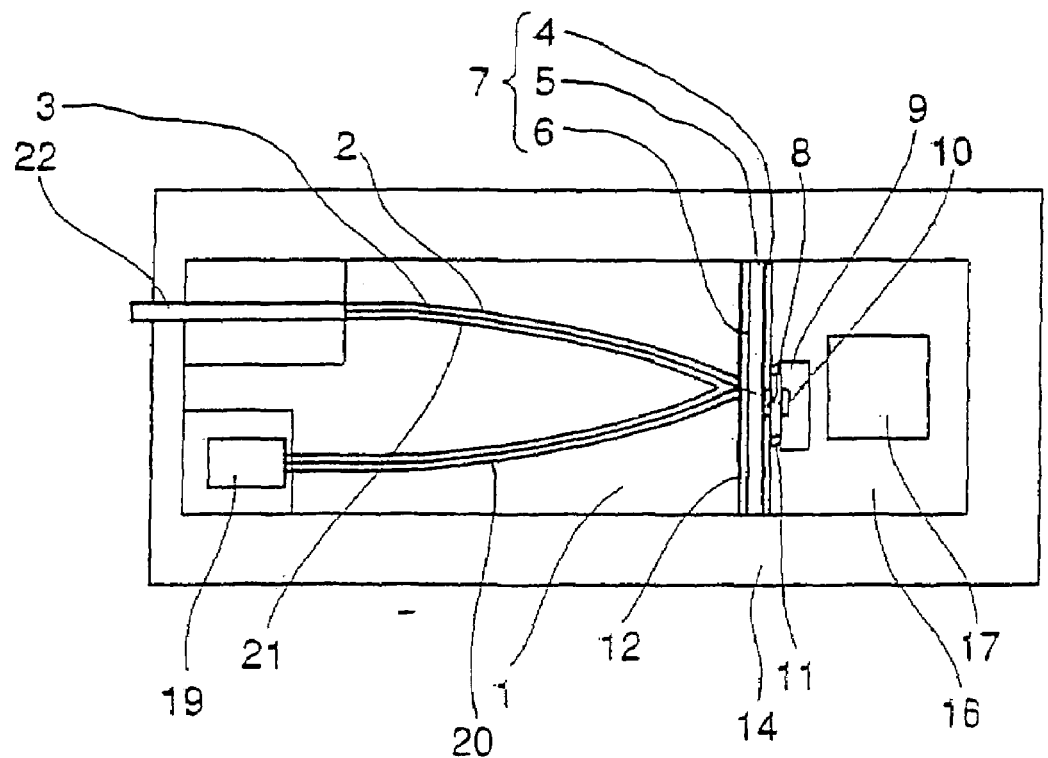
FIG. 4 is a plan view of an example in which the optical waveguide module shown in FIG. 3 is applied to a receiver module.

FIG. 4 is a plan view of an example in which the optically coupled structure of the optical waveguide and light-receiving element in the above-described optical waveguide module according to the first embodiment of the present invention is applied to an optical waveguide transmitter and receiver module that is used in wavelength-division multiplex transmission.

In this example, two optical waveguides 2, one for transmission port 20 and one for common port 21, are formed in optical waveguide substrate 1. The two optical waveguides 2 intersect at an angle of 10° to 30° at their ends on the side which is close to light-receiving element 9. Light-emitting device 19 and optical fiber 22 are installed at the end of optical waveguide substrate 1 that is opposite side from light-receiving element 9. The optical axis of core 3 of optical waveguide 2 for transmission port 20 is aligned with the optical axis of light-emitting device 19 with an accuracy having error on the order of ±1 μm. The optical axis of core 3 of optical waveguide 2 for common port 21 is aligned with the optical axis of optical fiber 22 with an accuracy having error on the order of ±2 μm. Light of wavelength λ2 (for example, 1.3 μm) that is emitted from light-emitting device 19 is propagated through optical waveguide 2 for transmission port 20 and reflected by filter film 6, and further, propagated through optical waveguide 2 for common port 21, guided to optical fiber 22 and transmitted to outside the optical waveguide module. On the other hand, light of wavelength λ1 that is transmitted from the outside by optical fiber 22 is propagated through optical waveguide 2 for common port 21, passes through filter film 6, and directed to light-receiving region 10 of light-receiving element 9.

Light that is emitted from light-emitting device 19 contains a slight amount of light of wavelength λ1, and this light is propagated through optical waveguide 2 for transmission port 20 and passes through filter film 6. However, the optical axis of optical waveguide 2 for transmission port 20 and the optical axis of optical waveguide 2 for common port 21 together form an angle of 10° to 30°, and aperture 8 and the center of light-receiving region 10 of light-receiving element 9 are arranged to face the optical axis of optical waveguide 2 for common port 21. Accordingly, light from optical waveguide 2 for transmission port 20 that passes through filter film 6 is cut off by surface electrical wiring 4 and is not incident on light-receiving region 10. Further, unnecessary light that undergoes diffuse reflection inside the optical waveguide module is cut off by surface electrical wiring 4 and prevented incident on light-receiving element 9.

Figure 5:
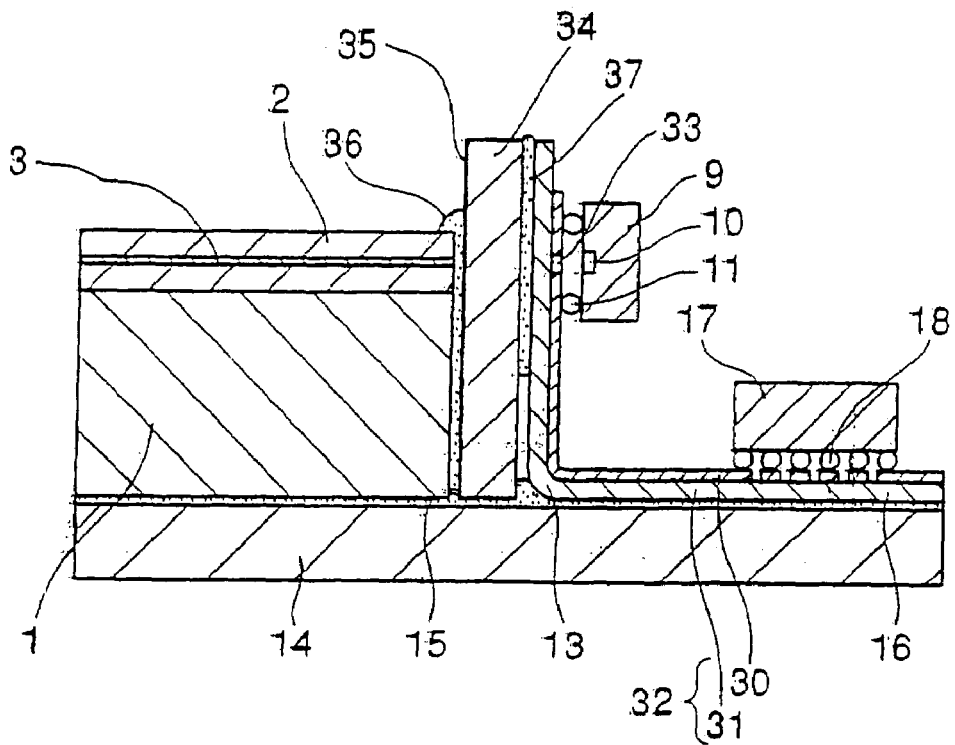
FIG. 5 is a sectional view showing the optical waveguide module of the second embodiment of the present invention.

FIG. 5 shows the optically coupled configuration of the optical waveguide and light-receiving element in the optical waveguide module according to the second embodiment of the present invention. FIG. 5 is a sectional view taken along a cutting surface including the optical axis of the core of the optical waveguide.

In this embodiment, wiring board 32 having a thickness of 50 μm is composed of base member 31 and surface electrical wiring 30. Base member 31 has transparency with respect to light of wavelength λ1 (for example, 1.55 μm) that can be received by light-receiving element 9. Aperture 33 having a diameter of 100 μm, which is larger than a diameter of core 3 of optical waveguide 2, is formed in surface electrical wiring 30 of wiring board 32. Main surface-incidence type light-receiving element 9 is flip-chip mounted on surface electrical wiring 30 using gold stud bumps 11 having a height of approximately 20 μm. Light-receiving region 10 of this light-receiving element 9 is arranged to face wiring board 32. The mounting accuracy of light-receiving element 9 with respect to wiring board 32 should be of such degree as light-receiving region 10 having a diameter of 80 μm of light-receiving element 9 enters within the area of aperture 33 having a diameter of 100 μm, and more specifically, should have error on the order of 10 μm. Wavelength filter plate (a wavelength filter in a plate shape) 34 having filter film 35 is secured by resin 36 to the end surface of optical waveguide substrate 1. Filter film 35 has characteristics for passing light of wavelength λ1 that can be received by light-receiving element 9 and for reflecting light of other wavelengths. The surface of wiring board 32 that is on the opposite side from the surface on which light-receiving element 9 is mounted is secured by resin 37 to wavelength filter plate 34. The optical axis of core 3 of optical waveguide 2 is aligned with the center of light-receiving region 10 of light-receiving element 9 with accuracy having error of ±5 μm to ±10 μm. The configuration is otherwise similar to that of the first embodiment, and explanation is therefore here omitted.

In the present embodiment, the number of assembly steps for forming the optically coupled configuration of optical waveguide 2 and light-receiving element 9 does not differ greatly from the prior art. However, there is no need to accurately secure wavelength filter plate 34 to waveguide substrate 1. In addition, the number of steps that require high-accuracy assembly can be reduced for the same reason as the first embodiment. These factors all contribute to a reduction of fabrication costs.

In addition, the present embodiment further allows the free selection and use of wavelength filter plate 34 that is already conventionally fabricated and in use, and the present embodiment is therefore efficient and practical and suppresses fabrication costs.

Figure 6:
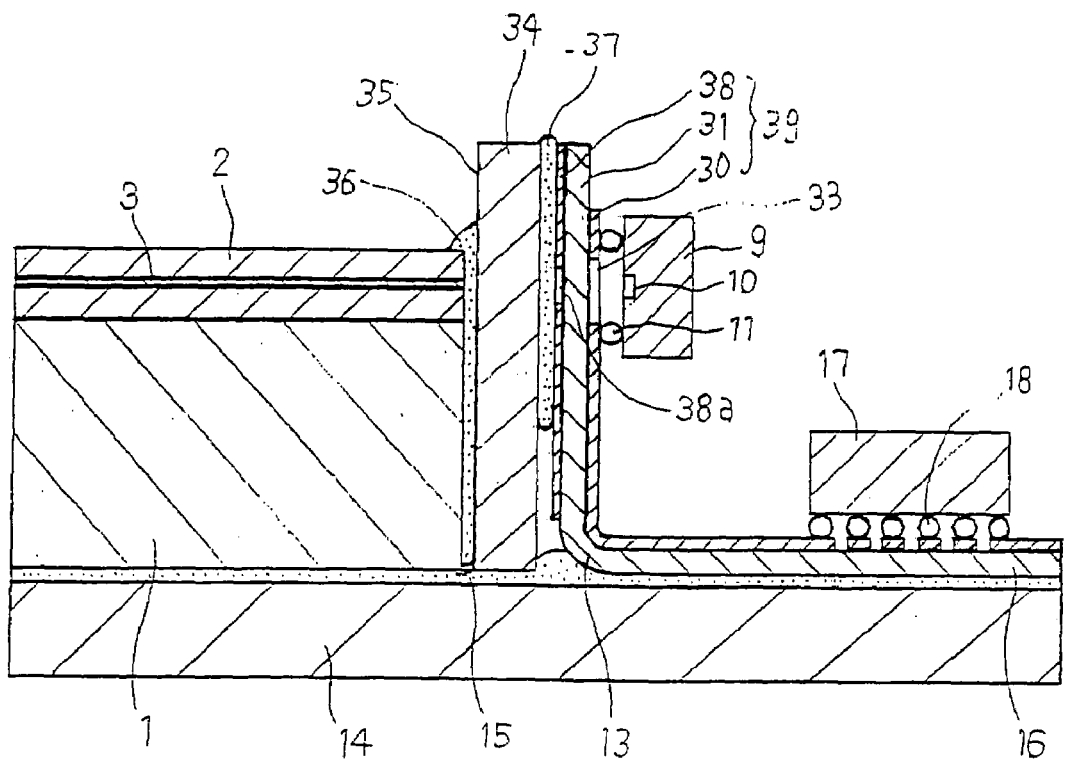
FIG. 6 is a sectional view showing a modification of the optical waveguide module according to the second embodiment of the present invention.

FIG. 6 shows a modification of this second embodiment. As shown in this modification, a configuration is also possible that uses double-sided wiring board 39 that is composed of base member 31, surface electrical wiring 30, and rear-surface wiring board 38, and that is provided with pinhole 38a in rear-surface wiring board 38.

Figure 7:
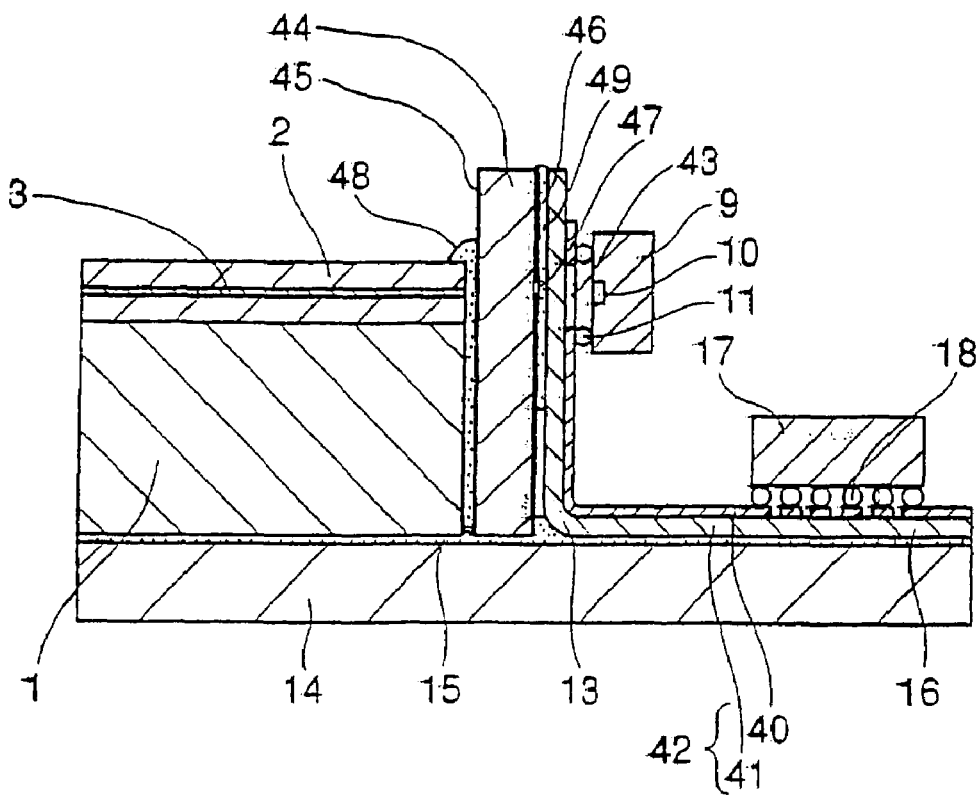
FIG. 7 is a sectional view showing the optical waveguide module according to the third embodiment of the present invention.

FIG. 7 shows the optically coupled structure of the optical waveguide and light-receiving element in the optical waveguide module according to the third embodiment of the present invention. FIG. 7 is a sectional view taken along a cutting surface including the optical axis of the core of the optical waveguide.

In the present embodiment, wiring board 42 having a thickness of 50 μm is composed of base member 41 and surface electrical wiring 40. Base member 41 has transparency with respect to light of wavelength λ1 (for example, 1.55 μm) that can be received by light-receiving element 9. Aperture 43 having a diameter of 200 μm, which is sufficiently larger than a diameter of core 3 of optical waveguide 2, is formed in surface electrical wiring 40 of wiring board 42. Main surface-incidence type light-receiving element 9 is then flip-chip mounted on surface electrical wiring 40 using gold stud bumps 11 having a height of approximately 20 μm. Light-receiving region 10 of this light-receiving element 9 is arranged to face wiring board 42. The accuracy of mounting light-receiving element 9 to wiring board 42 should be of such degree as light-receiving region 10 having a diameter of 80 μm of light-receiving element 9 enters within the area of aperture 43 having a diameter of 200 μm, and more specifically, should have error on the order of ±60 μm. Wavelength filter plate (a wavelength filter in plate shape) 44 having filter film 45 and light-shielding film 46 is secured by resin 48 to the end surface of optical waveguide substrate 1. Filter film 45 has characteristics for passing light of wavelength λ1 that can be received by light-receiving element 9 and for reflecting light of other wavelengths. Aperture 47 having a diameter of 100 μm, which is larger than a diameter of core 3 of the optical waveguide, is formed in light-shielding film 46. Wavelength filter plate 44 is secured by resin 49 to the surface of wiring board 42 on the opposite side from the surface on which light-receiving element 9 is mounted. The optical axis of core 3 of the optical waveguide matches the center of light-receiving region 10 of light-receiving element 9 with accuracy having an error of ±5 μm to +10 μm. The configuration is otherwise similar to that of the first and second embodiments, and further explanation is therefore omitted.

In the present embodiment, the number of assembly steps for forming the optically coupled configuration of the optical waveguide and light-receiving element does not differ greatly from the prior art. However, the present embodiment eliminates the need for securing light-receiving element 9 to wiring board 42 with high accuracy. In addition, the number of steps that require high-accuracy assembly can be decreased for the same reasons as in the first embodiment. For these reasons, fabrication costs are reduced.

Figure 8:
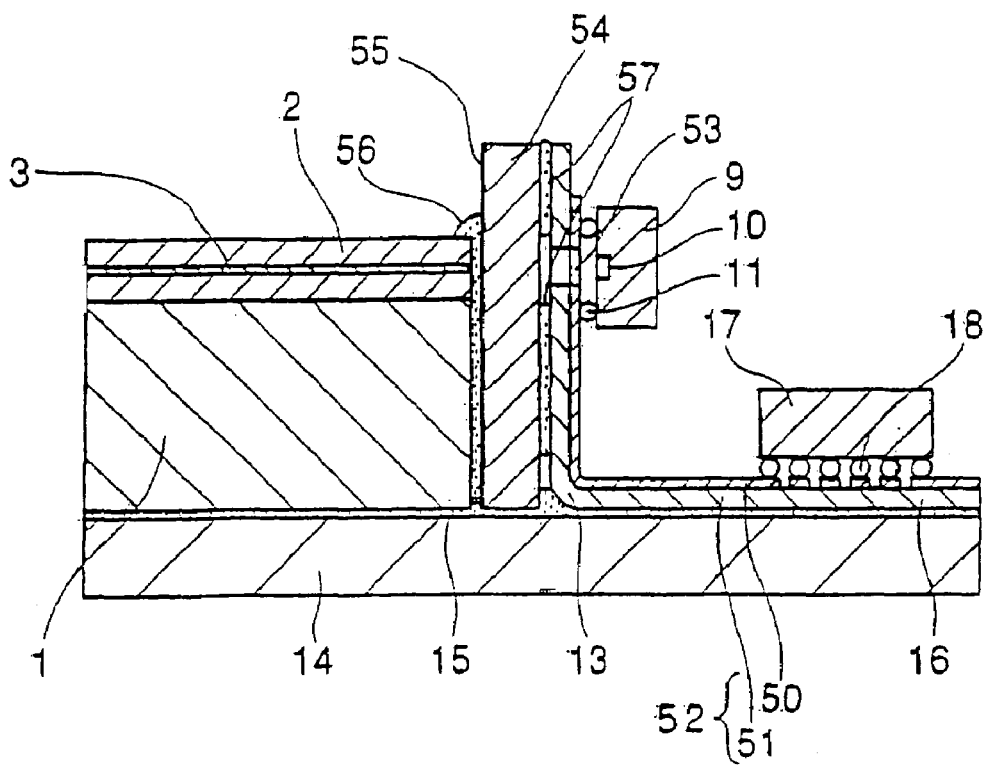
FIG. 8 is a sectional view showing the optical waveguide module of the fourth embodiment of the present invention.

FIG. 8 shows the optically coupled structure of the optical waveguide and light-receiving element in the optical waveguide module according to the fourth embodiment of the present invention. This FIG. 8 is a sectional view taken along a cutting surface including the optical axis of the core of the optical waveguide.

In this embodiment, wiring board 52 having a thickness of 50 μm is formed from base member 51 and surface electrical wiring 50. Base member 41 has a light-shielding property with respect to light of wavelength λ1 (for example, 1.55 μm) that can be received by light-receiving element 9. Through-hole 53 having a diameter of 100 μm, which is larger than a diameter of core 3 of the optical waveguide, is formed in wiring board 52. This through-hole 53 communicates with an aperture provided in surface electrical wiring 50 and an aperture provided in base member 51.

Main surface-incidence type light-receiving element 9 is flip-chip mounted on surface electrical wiring 50 using gold stud bumps 11 having a height of approximately 20 μm. This light-receiving element 9 is arranged to face wiring board 52. The accuracy of mounting this light-receiving element 9 to wiring board 52 should be of such degree as light-receiving region 10 having a diameter of 80 μm of light-receiving element 9 enters within the area of through-hole 53 having a diameter of 100 μm, and more specifically, should have error on the order of ±10 μm. Wavelength filter plate (a wavelength filter in a plate shape) 54 having filter film 55 is secured by resin 56 to the end surface of optical waveguide substrate 1. Filter film 55 has characteristics for passing light of wavelength λ1 that can be received by light-receiving element 9 and for reflecting light of other wavelengths. The surface of wiring board 52 that is on the opposite side from the surface on which light-receiving element 9 is mounted is secured by resin 57 to wavelength filter plate 54. The optical axis of core 3 of the optical waveguide matches with the center of light-receiving region 10 of light-receiving element 9 with an accuracy having error of ±5 μm to ±10 μm. The configuration is otherwise identical to that of the first to third embodiments, and detailed explanation is therefore here omitted.

In the present embodiment, the number of assembly steps for forming the optically coupled configuration of optical waveguide 2 and light-receiving element 9 does not differ greatly from the prior art. However, due to the relatively large size of through-hole 53, the present embodiment eliminates the need for high accuracy of securing wavelength filter plate 54 to optical waveguide substrate 1. In addition, the number of steps that require high-accuracy assembly can be decreased for the same reasons as in the first embodiment, and fabrication costs can therefore be reduced.

What is claimed is:
1. An optical waveguide module comprising:
 a wiring board in which electrical wiring is formed on at least one surface;
 a light-receiving element that is mounted on said wiring board such that the light-receiving region is arranged to face the surface on which said electrical wiring has been formed; and an optical waveguide substrate on which an optical waveguide has been formed that is positioned on the opposite side from said light-receiving element with said wiring board interposed; wherein a base member of said wiring board has transparency with respect to light of the wavelength that can be received by said light-receiving element;

a wavelength filter for reflecting light of wavelengths other than the wavelength that can be received by said light-receiving element, is arranged between said base member of said wiring board and said optical waveguide;

an aperture is formed in said electrical wiring at a position that faces said light-receiving region of said light-receiving element, this aperture being larger than the contour of the core of said optical waveguide; and the end of said optical waveguide of said optical waveguide substrate and said light-receiving region of said light-receiving element are optically coupled through said wavelength filter and said aperture.

2. An optical waveguide module according to claim 1, wherein said wavelength filter is a film formed on the surface on the side of said wiring board that is opposite side from the surface on which said light-receiving element is mounted.

3. An optical waveguide module according to claim 1, wherein said wavelength filter is a plate arranged between said optical waveguide substrate and the surface of said wiring board that is opposite side from the surface on which said light-receiving element is mounted.

4. An optical waveguide module according to claim 3, wherein:

said aperture in said electrical wiring is formed at a position that faces said light-receiving region and extends over a wider area than the contour of said light-receiving region; and said wavelength filter in a plate shape has a light-shielding film for shielding light that is not required for light-receiving in said light-receiving element, and having an aperture formed at a position of said light-shielding film that faces said light-receiving region of said light-receiving element, this aperture being larger than the contour of the core of said optical waveguide.

5. An optical waveguide module according to claim 3, wherein said aperture in said electrical wiring is communicated with the aperture formed in said base member to form a through-hole through said wiring board.

6. An optical waveguide module according to claim 4, wherein said aperture in said electrical wiring is communicated with the aperture formed in said base member to form a through-hole through said wiring board.

7. An optical waveguide module according to claim 1, wherein said base member of said wiring board is composed of a flexible dielectric material.

8. An optical waveguide module according to claim 7, wherein said wiring board bends in a location other than the portion in which said light-receiving element is mounted, and the surface of one part of said wiring board is substantially parallel to said optical waveguide.

9. An optical waveguide module according to claim 1, wherein an integrated circuit chip is mounted on said wiring board close to said light-receiving element.

* * * * *